United States Patent [19]

Bulka et al.

[11] Patent Number: 5,790,840

[45] Date of Patent: Aug. 4, 1998

[54] TIMESTAMP SYSTEMS, METHODS AND COMPUTER PROGRAM PRODUCTS FOR DATA PROCESSING SYSTEM

[75] Inventors: Dov Bulka, Raleigh; Martin J. C. Presler-Marshall, Chapel Hill, both of N.C.

[73] Assignee: International Business Machines Corporation, Armonk, N.Y.

[21] Appl. No.: 912,285

[22] Filed: Aug. 15, 1997

[51] Int. Cl.$^6$ ............................................. G06F 1/14
[52] U.S. Cl. ................................................ 395/557
[58] Field of Search .............................. 395/555, 557; 364/550, 569

[56] References Cited

U.S. PATENT DOCUMENTS

| 4,040,034 | 8/1977 | Belady et al. | 711/154 |
| 5,574,867 | 11/1996 | Khaira | 395/293 |
| 5,682,328 | 10/1997 | Roeber et al. | 364/550 |

*Primary Examiner*—Thomas M. Heckler
*Attorney, Agent, or Firm*—Myers Bigel Sibley & Sajovec

[57] ABSTRACT

Timestamp updating systems, methods and computer program products for data processing systems provide a timestamp register that stores a current value of a timestamp and a time thread that repeatedly generates a current value of a timestamp and stores the current value of a timestamp so generated in the timestamp register. When the timestamp is being stored in the register, applications are locked from accessing the register. At other times, however, the applications may obtain the timestamp from the timestamp register, rather than accessing the system clock and formatting a timestamp each time a timestamp is required. A semaphore may be used to lock and unlock the timestamp register. Alternatively, a buffer is provided including a plurality of registers, each of which stores a timestamp therein. A time thread repeatedly generates a current value of a timestamp from the system clock and stores the current value of a timestamp so generated in a selected one of the registers. Applications can concurrently obtain a current value of a timestamp from the remaining ones of the registers.

41 Claims, 3 Drawing Sheets

TIMESTAMP SYSTEMS, METHODS AND COMPUTER PROGRAM PRODUCTS FOR DATA PROCESSING SYSTEM

FIELD OF THE INVENTION

This invention relates to data processing systems, methods and computer program products, and more particularly to clocking systems, methods and computer program products for data processing systems.

BACKGROUND OF THE INVENTION

In data processing, it is often necessary or desirable to provide a timestamp. As is well known to those having skill in the art, a timestamp generally includes a date and a time. For example, a timestamp may read "Thursday, Jul. 7, 1997, 8:00:05AM" where the designation "Thursday, Jul. 7, 1997" represents the current date and the designation "8:00:05AM" represents the current time of day. It will also be understood that many different representations can be used to represent a date and a time.

A timestamp may be generated by an application that runs in the data processing system. As is well known to those having skill in the art, a timestamp is conventionally generated by accessing the system clock to obtain a time, and then formatting this time into a timestamp.

An application may generate a timestamp for many reasons, which may depend on the function of the application. For example, an application may generate a timestamp when a file is generated, in response to a user request, and/or in response to a request from another application.

As the number of applications which may be concurrently running in a data processing system continues to increase, the generation of timestamps by the multiple applications may consume ever increasing resources in the data processing system. For example, a single high-performance application that generates timestamps frequently may read the system clock and format the timestamp hundreds, thousands or more times per second. Each timestamp generation may take hundreds or thousands of instructions. Thus, when many different applications generate timestamps, the burden on the data processing system may be excessive.

The burden on the data processing system to generate timestamps may be particularly excessive in view of the fact that the timestamp itself generally is of low granularity relative to the number of times the timestamp may be generated. In particular, timestamps generally have a granularity of one second. However, as described above, the timestamp may be generated hundreds or thousands of times per second by each of multiple applications that run on a data processing system.

In a specific example, an Internet web server may be responsive to many user requests, and may provide a timestamp to the user, along with the response. Many user requests may be accommodated simultaneously by many different applications at the web server. Yet, each response will generally access the system clock and format a timestamp for inclusion in the response. Because of the low granularity of the timestamp, many of the responses will include the identical timestamp even though they are generated separately.

SUMMARY OF THE INVENTION

It is therefore an object of the present invention to provide improved systems, methods and computer program products for generating and updating timestamps in a data processing system.

It is another object of the present invention to provide timestamp systems, methods and computer program products which need not consume excessive system resources.

These and other objects are provided, according to the invention, by providing a timestamp register that stores a current value of a timestamp and a time thread that repeatedly generates a current value of a timestamp and stores the current value of a timestamp so generated in the timestamp register. When the timestamp is being stored in the register, applications are locked from accessing that register. At other times, however, the applications may obtain a timestamp from the timestamp register, rather than accessing the system clock and formatting a timestamp each time a timestamp is required.

The applications may not access the timestamp register when the current value of the timestamp is being updated. Accordingly, the timestamp that is obtained is accurate. As long as the current timestamp is updated within the granularity that is used by the applications, a timestamp with the requisite granularity can be provided without requiring each application to individually access the system clock each time a timestamp is needed. The ability to provide a timely update may be readily provided by conventional operating systems.

In a first aspect of the present invention, a semaphore is used to lock and unlock the timestamp register. As is well known to those having skill in the art, a semaphore is a well known programming tool that can be used to selectively unlock a buffer for access by only one application. According to the invention, a data processing system that includes a system clock and a plurality of applications running in the data processing system, also includes a timestamp register that stores a current value of a timestamp. A time thread repeatedly generates a current value of a timestamp and stores the current value of a timestamp so generated in the timestamp register. A semaphore locks the timestamp register from the plurality of applications when the time thread stores the current value of a timestamp in the timestamp register, and otherwise unlocks the timestamp register to one of the plurality of applications for serial access by the plurality of applications to the timestamp register.

Accordingly, when an application needs a timestamp, it can access the semaphore. If the timestamp register is unlocked, the semaphore locks the register and allows the application to read the timestamp. The register is then unlocked again. Locking of the timestamp register by the time thread locks the timestamp register from all of the applications.

Another aspect of the invention allows the time thread to store a timestamp in a timestamp register while still allowing concurrent access by other applications to the timestamp. According to this aspect, a buffer is provided including a plurality of registers, each of which stores a timestamp therein. A time thread repeatedly generates a current value of a timestamp from the system clock and stores the current value of a timestamp so generated in a selected one of the registers. Applications concurrently obtain a current value of a timestamp from the remaining ones of the registers.

In a particular embodiment of this aspect, a pointer is included to sequentially identify a register in the buffer. The pointer can thereby create a circular buffer. The time thread repeatedly generates a current value of a timestamp from the system clock, and stores the current value of the timestamp so generated in a next register that sequentially follows the register that is identified by the pointer. The pointer is then incremented. The plurality of applications also obtain the current value of the timestamp that is stored in a register that is identified by the pointer, and then increment the pointer. Accordingly, multiple applications can concurrently obtain a timestamp, within the requisite granularity, while allowing updating of the timestamp sufficiently often to preserve the requisite granularity. Repeated accesses to the system clock and repeated formatting of the output of the system clock by multiple applications, and the resultant overhead penalty, can be reduced or eliminated.

It will be understood that the present invention can be provided in the form of systems (apparatus), methods, computer program products and combinations thereof.

DETAILED DESCRIPTION OF PREFERRED EMBODIMENTS

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
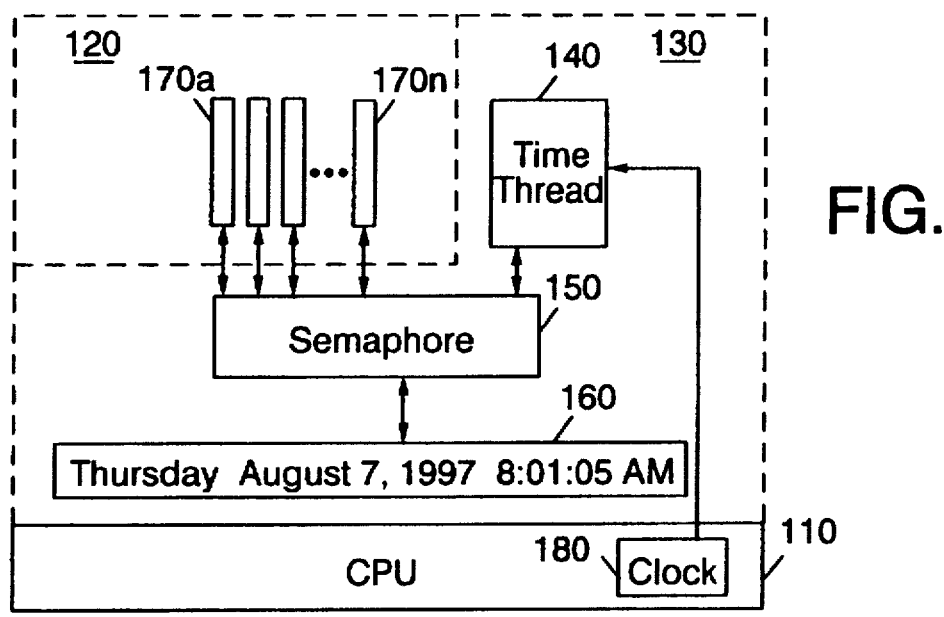
FIG. 1 is a block diagram of a first embodiment of data processing systems including timestamping according to the present invention.

Referring now to FIG. 1, a data processing system including timestamp updating according to the present invention will now be described. As shown in FIG. 1, data processing system 100 includes a central processing unit (CPU) 110 which includes a clock 180. Data processing system 100 further includes an operating system 130 and an application layer 120 including a plurality of applications 170a–170n that run in the data processing system 100.

As shown in FIG. 1, timestamping according to the present invention is included in operating system 130. However, it will also be understood by those having skill in the art that timestamping according to the invention may be provided in application layer 120, in the CPU 110, or in combinations of hardware and software.

Still referring to FIG. 1, a timestamp register 160 is included that stores a current value of a timestamp. As shown in FIG. 1, the timestamp "Thursday, Aug. 7, 1997, 8:01:05AM" is stored. The timestamp includes a date portion "Thursday, Aug. 7, 1997" and a time portion "8:01:05AM". However, it will be understood that many other representations of the date and time portions which comprise a timestamp may be included.

A time thread 140 is also included. The time thread repeatedly generates a current value of a timestamp from the system clock 180, and stores the current value of a timestamp so generated in the timestamp register 160.

Still referring to FIG. 1, a semaphore 150 is also included. As is well known to those having skill in the art, a semaphore is a hardware or software switch that allows access to a register by one and only one of a plurality of requesting units. Semaphores are described in a textbook by Silberschatz et al. entitled "Operating System Concepts, Third Edition", pages 149–151, 1991, the disclosure of which is hereby incorporated herein by reference.

As shown in FIG. 1, semaphore 150 locks the timestamp register 160 from the plurality of applications 170a–170n when the time thread 140 stores the current value of a timestamp in the timestamp register. 160. At other times, the timestamp register is unlocked to one of the plurality of applications 170a–170n for serial access by the plurality of applications to the timestamp register. Thus, the semaphore is a mutual exclusion semaphore.

Figure 2:
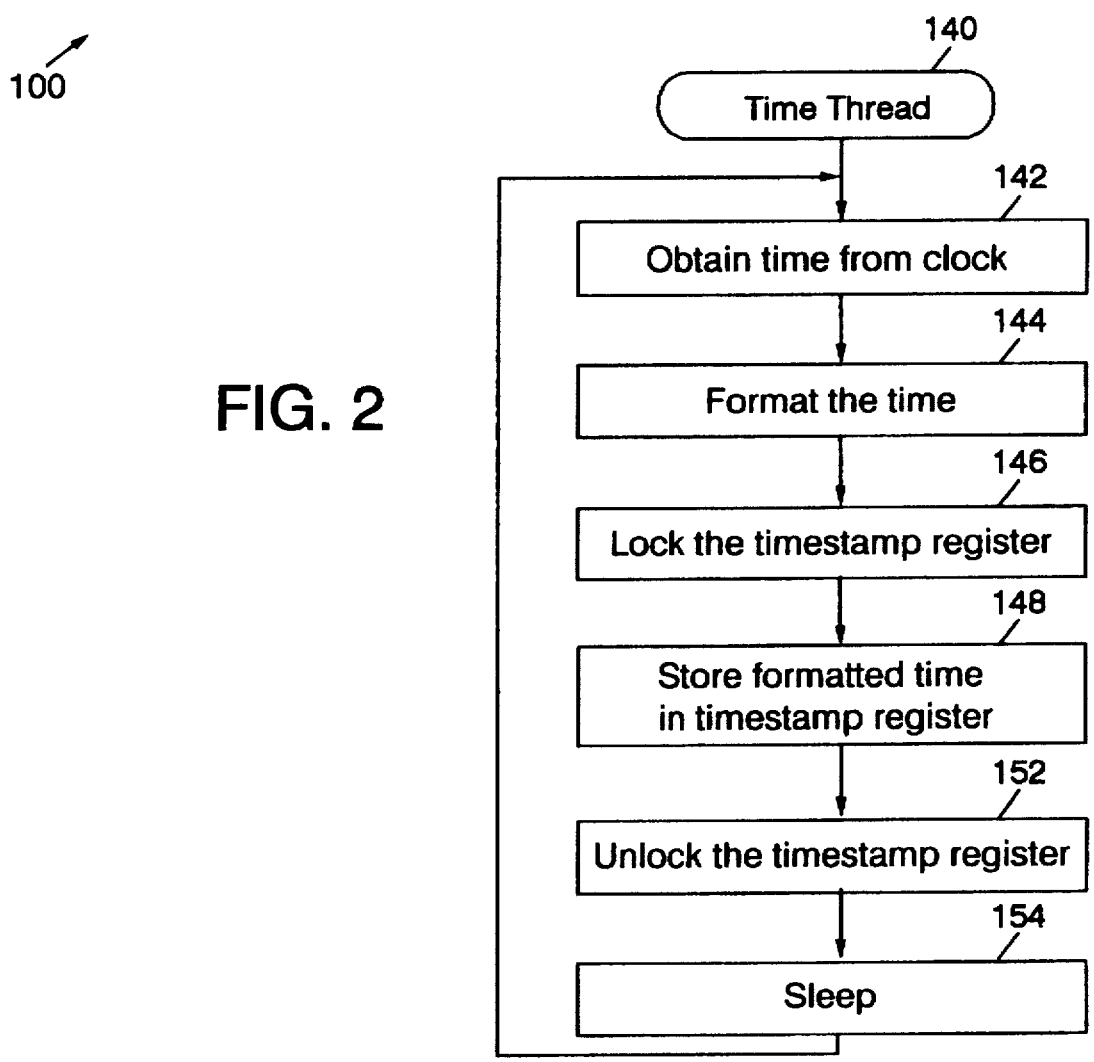
FIG. 2 is a flowchart illustration of a time thread of FIG. 1.

Referring now to FIG. 2, time thread 140 will be described in detail. As shown in FIG. 2, time thread 140 obtains the time from system clock 180 at Block 142. At Block 144, the time thread formats the time into a timestamp and at Block 146 the timestamp register is locked. At Block 148, the formatted timestamp is stored in the timestamp register 160. The register is unlocked at Block 152. The time thread then enters an inactive or "sleep" mode 146 at Block 154, during which time the other applications 170a–170n can access the timestamp register. At the end of the inactive mode, a new time is obtained from the clock at Block 142.

For example, the time thread can be scheduled to wake up from inactive mode once every second. The thread may be assigned very high priority for access to CPU 110 so that it can be scheduled close to every second. On each wake up, the time thread samples the system clock 180 (Block 142), formats the time into the timestamp and places the timestamp in the timestamp register 160 (Block 144). It then returns to sleep (Block 146) for the remainder of the second.

It will be understood that the embodiment of FIGS. 1 and 2 may create interapplication semaphore locking. In particular, when the time thread 140 is storing the timestamp in timestamp register 160, the remaining applications 170a–170n preferably are locked from the timestamp register 160 to prevent an erroneous reading. Thereafter, the semaphore preferably allows only one of the applications 170a–170n to access the timestamp register 160 to prevent an erroneous reading. The remaining applications may be locked from the timestamp register. Thus, semaphore locking may cause applications to wait to access the timestamp, which may itself create undue bottlenecks and overhead problems in the data processing system.

Figure 3:
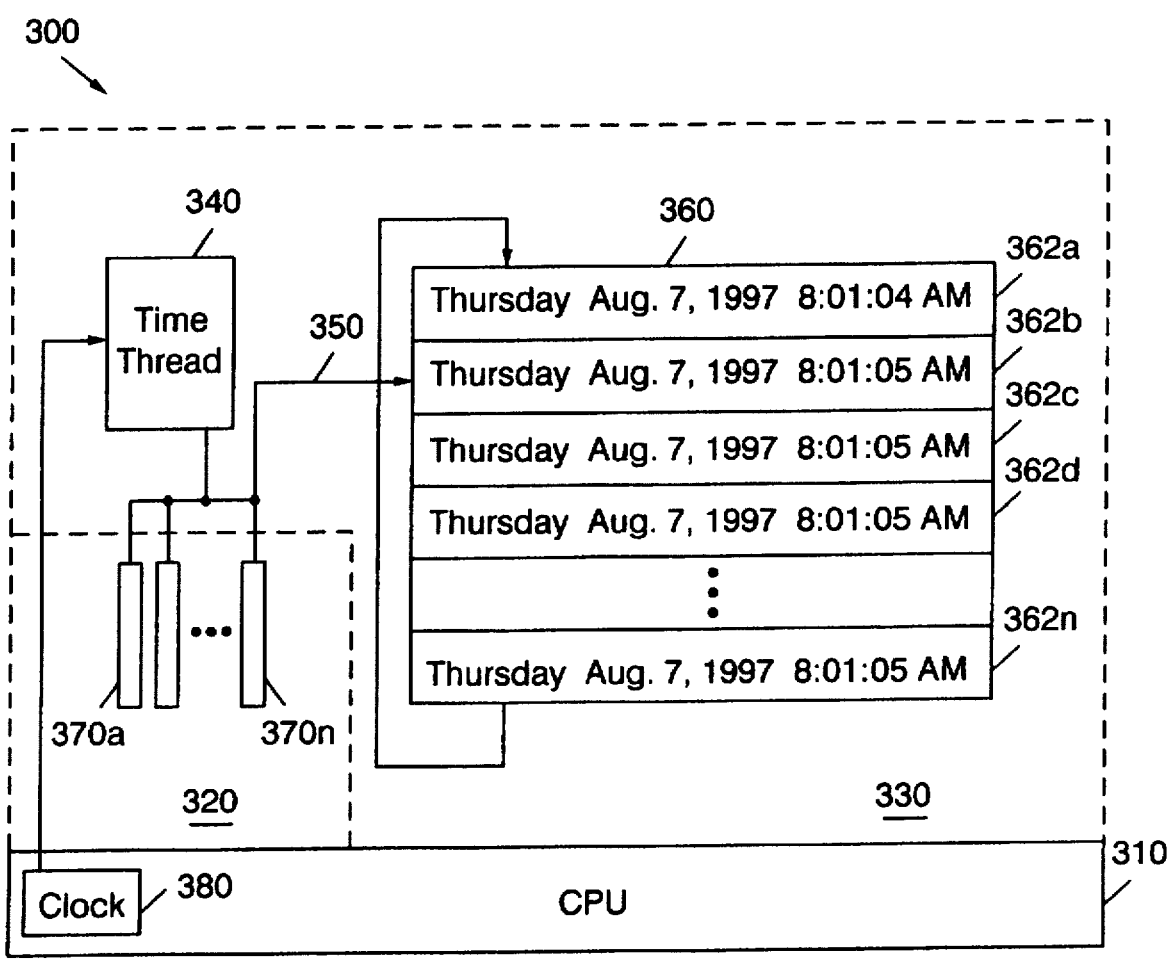
FIG. 3 is a block diagram of a second embodiment of data processing systems including timestamping according to the present invention.

Referring now to FIG. 3, a second embodiment of timestamping according to the present invention will be described. This embodiment can allow the time thread and multiple applications to concurrently access a timestamp register, while retaining the requisite timestamp granularity. Accordingly, application locking which may be produced when using a mutual exclusion semaphore of FIG. 1, can be reduced and preferably eliminated.

As shown in FIG. 3, a data processing system 300 includes a CPU 310, a clock 380, an operating system 330 and an application layer 320. A plurality of applications 370a–370n are included in the application layer. As was the case in is 3 FIG. 1, although timestamping according to the invention is shown as residing in operating system 330, it may reside in application layer 320, in CPU 310 or in other parts of data processing system 300. Similarly, timestamping may be implemented in hardware, software or combinations of hardware and software.

Still referring to FIG. 3, a buffer 360 is provided. The buffer includes a plurality of registers 362a–362n, each of which stores a timestamp therein. A pointer 350 is also included. As shown in FIG. 3, the pointer sequentially identifies register 362a–362n in the buffer 360. When the last register 362n is identified, incrementing the pointer identifies the first register 362a, to thereby provide a circular buffer. It will be understood by those having skill in the art that pointer 350 and buffer 360 may be embodied by tables, linked lists or other techniques which are well known to those having skill in the art.

The buffer 360 and pointer 350 allow time thread 340 to repeatedly generate a current value of a timestamp from the system clock 380 and to store the current value of a timestamp so generated in a selected one of the registers 362a–362n. Concurrently, the applications 370a–370n can obtain a current value of a timestamp from remaining ones of the registers 362a–362n.

In particular, the time thread 340 repeatedly generates a current value of timestamp from the system clock, stores the current value of a timestamp so generated in a next register that sequentially follows the register that is identified by the pointer, and then increments the pointer. For example, if the pointer currently points to register 362b, the time thread generates a current value of a timestamp and stores the current value of the timestamp in register 362c. The pointer is then incremented to point to register 362c.

When one of the plurality of applications needs a timestamp, it obtains the current value of the timestamp that is stored in the register that is identified by the pointer, and increments the pointer 350. Thus, continuing with the above example, since the pointer points to register 362c, a timestamp will be obtained from register 362c by the next application 370a–370n that needs a timestamp. The pointer will then be updated to point to register 362d.

Figure 4:
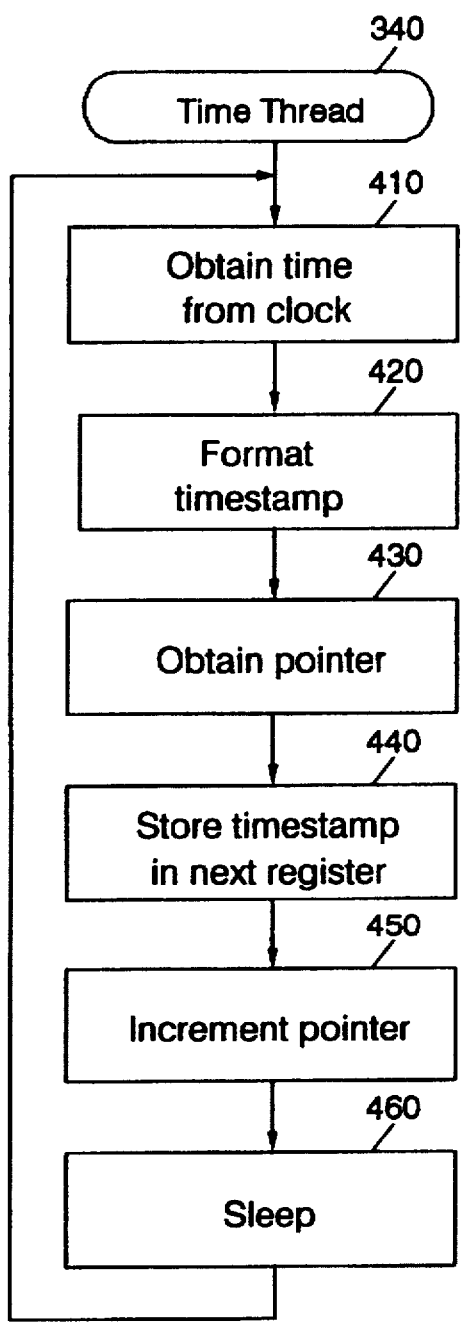
FIG. 4 is a flowchart illustration of a time thread of FIG. 3.

The time thread 340 is described in detail in FIG. 4. As shown in FIG. 4, the time thread 340 obtains the time from the system clock 380 at Block 410. At Block 420, the obtained time is formatted into a current value of a timestamp. At Block 430, the pointer is obtained and the timestamp (formatted time) is stored in the next location, i.e. in the register that sequentially follows the register that is identified by the pointer. Then at Block 450, the pointer is incremented, and the time thread enters sleep mode at Block 460. Once reawakened, the time thread again obtains the time from the clock at Block 410.

Figure 5:
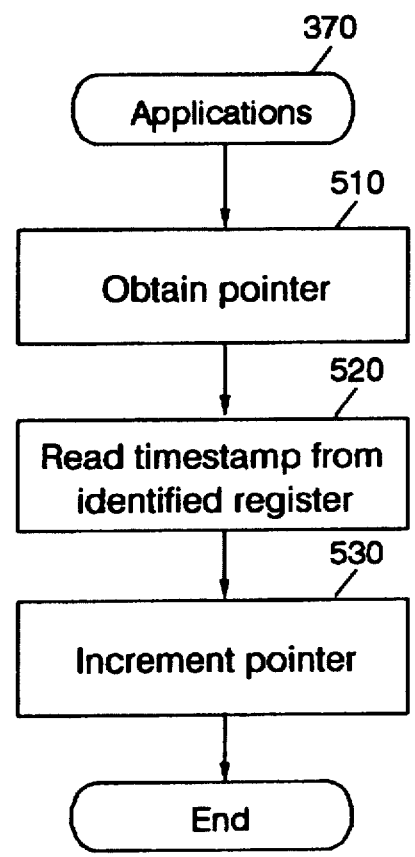
FIG. 5 is a flowchart illustration of applications of FIG. 3.

Applications obtain a timestamp as illustrated in FIG. 5. As shown at Block 510, the pointer is obtained and used at Block 520 to read a timestamp from the identified register 362a–362n that is identified by the pointer. The pointer is then incremented at Block 530.

Accordingly, when an application 370 needs the current time, it pulls the desired timestamp from the buffer 360 using the current value pointer 350 which is maintained by the time thread 340. This operation generally can be performed much faster than reading the system clock and formatting the result. Since the time thread can run at a very high priority and can wake up every second, the timestamp may be no more than one second out of date. Moreover, assuming that the buffer 360 is large enough, for example several hundred entries, an application 370a–370n need not ever access a register while it is being updated by the time thread 340. Thus, timestamps can be obtained frequently, without incurring a system call and formatting overhead for each timestamp.

The present invention was described herein with respect to flowchart illustrations of embodiments or aspects of the present invention. It will be understood that each block of the flowchart illustrations, and combinations of blocks in the flowchart illustrations, can be implemented by computer program instructions. These program instructions may be provided to a processor to produce a machine, such that the instructions which execute on the processor create means for implementing the functions specified in the flowchart block or blocks. The computer program instructions may be executed by a processor to cause a series of operational steps to be performed by the processor to produce a computer implemented process such that the instructions which execute on the processor provide steps for implementing the functions specified in the flowchart block or blocks.

Accordingly, blocks of the flowchart illustrations support combinations of means for performing the specified functions, combinations of steps for performing the specified functions and program instruction means for performing the specified functions. It will also be understood that each block of the flowchart illustrations, and combinations of blocks in the flowchart illustrations, can be implemented by special purpose hardware-based systems which perform the specified functions or steps, or combinations of special purpose hardware and computer instructions.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A system for updating a timestamp of a data processing system that includes a system clock and a plurality of applications running in the data processing system, the timestamp updating system comprising:

a timestamp register that stores a current value of a timestamp;

a time thread that repeatedly generates a current value of a timestamp from the system clock, and stores the current value of a timestamp so generated in the timestamp register; and a semaphore that locks the timestamp register from the plurality of applications when the time thread stores the current value of a timestamp in the timestamp register and otherwise unlocks the timestamp register to one of the plurality of applications for serial access by the plurality of applications to the timestamp register.

2. A system according to claim 1 wherein the time thread periodically generates the current value of the timestamp from the system clock, and is otherwise inactive.

3. A data processing system comprising:

a system clock;

a plurality of applications running in the data processing system;

a timestamp register that stores a current value of a timestamp;

a time thread that repeatedly generates a current value of a timestamp from the system clock, and stores the current value of a timestamp so generated in the timestamp register; and a semaphore that locks the timestamp register from the plurality of applications when the time thread stores the current value of a timestamp in the timestamp register and otherwise unlocks the timestamp register to one of the plurality of applications for serial access by the plurality of applications to the timestamp register.

4. A system according to claim 3 wherein the time thread periodically generates the current value of the timestamp from the system clock, and is otherwise inactive.

5. A timestamping system for a data processing system that includes a system clock and a plurality of applications running in the data processing system, the timestamping system comprising:

a buffer including a plurality of registers;

a pointer that sequentially identifies a register in the buffer; and a time thread that repeatedly generates a current value of a timestamp from the system clock, stores the current value of a timestamp so generated in a next register that sequentially follows the register that is identified by the pointer, and increments the pointer;

wherein the plurality of applications obtain the current value of the timestamp that is stored in a register that is identified by the pointer, and increment the pointer.

6. A timestamping system according to claim 5 wherein the pointer sequentially and circularly identifies one of the registers.

7. A timestamping system for a data processing system that includes a system clock and a plurality of applications running in the data processing system, the timestamping system comprising:

a buffer including a plurality of registers, each of which stores a timestamp therein; and a time thread that repeatedly generates a current value of a timestamp from the system clock and stores the current value of a timestamp so generated in a selected one of the registers, the applications concurrently obtaining a current value of a timestamp from remaining ones of the registers.

8. A timestamping system according to claim 7 wherein the time thread repeatedly increments the selected one of the registers.

9. A data processing system comprising:

a system clock;

a plurality of applications running in the data processing system;

a buffer including a plurality of registers, each of which stores a timestamp therein; and a time thread that repeatedly generates a current value of a timestamp from the system clock and stores the current value of a timestamp so generated in a selected one of the registers;

wherein the applications concurrently obtain a current value of a timestamp from remaining ones of the registers.

10. A timestamping system according to claim 9 wherein the time thread repeatedly increments the selected one of the registers.

11. A system for updating a timestamp of a data processing system that includes a system clock and a plurality of applications running in the data processing system, the timestamp updating system comprising:

a timestamp register that stores a current value of a timestamp;

a time thread that repeatedly generates a current value of a timestamp and stores the current value of a timestamp so generated in the timestamp register; and wherein the timestamp register is locked from the plurality of applications when the time thread stores the current value of a timestamp in the timestamp register.

12. A system according to claim 11 wherein the time thread periodically generates the current value of the timestamp from the system clock, and is otherwise inactive.

13. A system according to claim 11 wherein the timestamp register is unlocked to one of the plurality of applications for serial access by the plurality of applications to the timestamp register when the time thread does not store the current value of a timestamp in the timestamp register.

14. A system according to claim 11:

wherein the timestamp register comprises a plurality of registers, each of which stores a current value of a timestamp;

wherein the timestamp thread stores the current value of a timestamp in a selected one of the plurality of registers; and wherein the selected one of the plurality of registers is locked from the plurality of applications when the time thread stores the current value of a timestamp in the selected one of the plurality of registers.

15. A system according to claim 14 wherein remaining ones of the plurality of registers are unlocked to the plurality of applications when the time thread stores the current value of a timestamp in the selected one of the plurality of registers.

16. A data processing system comprising:

a system clock;

a plurality of applications running in the data processing system;

a timestamp register that stores a current value of a timestamp;

a time thread that repeatedly generates a current value of a timestamp and stores the current value of a timestamp so generated in the timestamp register; and wherein the timestamp register is locked from the plurality of applications when the time thread stores the current value of a timestamp in the timestamp register.

17. A system according to claim 16 wherein the time thread periodically generates the current value of the timestamp from the system clock, and is otherwise inactive.

18. A system according to claim 16 wherein the timestamp register is unlocked to one of the plurality of applications for serial access by the plurality of applications to the timestamp register when the time thread does not store the current value of a timestamp in the timestamp register.

19. A system according to claim 16:

wherein the timestamp register comprises a plurality of registers, each of which stores a current value of a timestamp;

wherein the timestamp thread stores the current value of a timestamp in a selected one of the plurality of registers; and wherein the selected one of the plurality of registers is locked from the plurality of applications when the time thread stores the current value of a timestamp in the selected one of the plurality of registers.

20. A system according to claim 19 wherein remaining ones of the plurality of registers are unlocked to the plurality of applications when the time thread stores the current value of a timestamp in the selected one of the plurality of registers.

21. A method for updating a timestamp of a data processing system that includes a system clock and a plurality of applications running in the data processing system, the timestamp updating method comprising the steps of:

repeatedly generating a current value of a timestamp from the system clock;

storing the current value of a timestamp so generated in a timestamp register;

locking the timestamp register from the plurality of applications when storing the current value of a timestamp in the timestamp register; and otherwise unlocking the timestamp register to one of the plurality of applications for serial access by the plurality of applications to the timestamp register.

22. A method according to claim 21 wherein the repeatedly generating step comprises the step of:

periodically generating the current value of the timestamp from the system clock.

23. A timestamping method for a data processing system that includes a system clock and a plurality of applications running in the data processing system, the timestamping method comprising the steps of:

generating a current value of a timestamp from the system clock;

storing the current value of a timestamp so generated in a register of a buffer that includes a plurality of registers;

pointing to the register;

providing the current value of the timestamp that is stored in the pointed to register, and pointing to a next register in the buffer.

24. A timestamping method according to claim 23 wherein the step of pointing to a next register in the buffer comprises the step of sequentially and circularly pointing to a next register.

25. A timestamping method for a data processing system that includes a system clock and a plurality of applications running in the data processing system, the timestamping method comprising the steps of:

repeatedly generating a current value of a timestamp from the system clock;

storing the current value of a timestamp so generated in a selected register of a buffer that includes a plurality of registers; and providing a current value of a timestamp from remaining ones of the registers.

26. A timestamping method according to claim 25 further comprising the step of incrementally selecting one of the registers for storing the current value of a timestamp thereon.

27. A method for updating a timestamp of a data processing system that includes a system clock and a plurality of applications running in the data processing system, the timestamp updating method comprising the steps of:

repeatedly generating a current value of a timestamp;

storing the current value of a timestamp so generated in a timestamp register; and locking the timestamp register from the plurality of applications when performing the step of storing the current value of a timestamp in the timestamp register.

28. A method according to claim 27 wherein the repeatedly generating step comprises the step of periodically generating the current value of the timestamp from the system clock.

29. A method according to claim 27 further comprising the step of unlocking the timestamp register to one of the plurality of applications for serial access by the plurality of applications to the timestamp register when not performing the step of storing the current value of a timestamp in the timestamp register.

30. A method according to claim 27:

wherein the timestamp register comprises a plurality of registers, each of which stores a current value of a timestamp;

wherein the storing step comprises the step of storing the current value of a timestamp in a selected one of the plurality of registers; and wherein the locking step comprises the step of locking the selected one of the plurality of registers from the plurality of applications when performing the step of storing the current value of a timestamp in the selected one of the plurality of registers.

31. A method according to claim 30 wherein remaining ones of the plurality of registers are unlocked to the plurality of applications when performing the step of storing the current value of a timestamp in the selected one of the plurality of registers.

32. A computer program product for updating a timestamp of a data processing system that includes a system clock and a plurality of applications running in the data processing system, the computer program product comprising a computer readable storage medium having computer-readable program code means embodied in the medium, the computer-readable program code means comprising:

computer-readable program code time thread means for repeatedly generating a current value of a timestamp from the system clock, and for storing the current value of a timestamp so generated in a timestamp register; and computer-readable program code semaphore means for locking the timestamp register from the plurality of applications when the time thread means stores the current value of a timestamp in the timestamp register and for otherwise unlocking the timestamp register to one of the plurality of applications for serial access by the plurality of applications to the timestamp register.

33. A computer program product according to claim 32 wherein the time thread means comprises means for periodically generating the current value of the timestamp from the system clock, and for otherwise being inactive.

34. A timestamping computer program product for a data processing system that includes a system clock and a plurality of applications running in the data processing system, the timestamping computer program product comprising a computer-readable storage medium having computer-readable program code means embodied in the medium, the computer-readable program code means comprising:

computer-readable program code means for providing a buffer including a plurality of registers;

computer-readable program code pointer means for sequentially identifying a register in the buffer; and computer-readable program code time thread means for repeatedly generating a current value of a timestamp from the system clock, for storing the current value of a timestamp so generated in a next register that sequentially follows the register that is identified by the pointer means, and for incrementing the pointer means; and computer-readable program code means for allowing the plurality of applications to obtain the current value of the timestamp that is stored in a register that is identified by the pointer means, and for incrementing the pointer means.

35. A timestamping computer program product according to claim 34 wherein the pointer means comprises means for sequentially and circularly identifying one of the registers.

36. A timestamping computer program product for a data processing system that includes a system clock and a plurality of applications running in the data processing system, the timestamping computer program product comprising a computer-readable storage medium having computer-readable program code means embodied in the medium, the computer-readable program code means comprising:

computer-readable program code means for providing a buffer including a plurality of registers, each of which stores a timestamp therein; and computer-readable program code time thread means for repeatedly generating a current value of a timestamp from the system clock and for storing the current value of a timestamp so generated in a selected one of the registers, and for allowing the applications to concurrently obtain a current value of a timestamp from remaining ones of the registers.

37. A timestamping computer program product according to claim 36 wherein the time thread means further comprises means for repeatedly incrementing the selected one of the registers.

38. A computer program product for updating a timestamp of a data processing system that includes a system clock and a plurality of applications running in the data processing system, the computer program product comprising a computer-readable storage medium having computer-readable program code means embodied in the medium, the computer-readable program code means comprising:

computer-readable program code means for providing a timestamp register that stores a current value of a timestamp;

computer-readable program code time thread means for repeatedly generating a current value of a timestamp and for storing the current value of a timestamp so generated in the timestamp register; and computer-readable program code means for locking the timestamp register from the plurality of applications when the time thread means stores the current value of a timestamp in the timestamp register.

39. A computer program product according to claim 38, further comprising computer-readable program code means for unlocking the timestamp register to one of the plurality of applications for serial access by the plurality of applications to the timestamp register when the time thread is not storing the current value of a timestamp in the timestamp register.

40. A computer program product according to claim 38:

wherein the timestamp register comprises a plurality of registers, each of which stores a current value of a timestamp;

wherein the timestamp thread comprises means for storing the current value of a timestamp in a selected one of the plurality of registers; and wherein the computer program product further comprises computer-readable program code means for locking the- selected one of the plurality of registers from the plurality of applications when the time thread is storing the current value of a timestamp in the selected one of the plurality of registers.

41. A computer program product according to claim 40 further comprising computer-readable program code means for unlocking remaining ones of the plurality of registers to the plurality of applications when the time thread is storing the current value of a timestamp in the selected one of the plurality of registers.

* * * * *